(12) United States Patent
Rothman et al.

(10) Patent No.: US 11,438,297 B2
(45) Date of Patent: *Sep. 6, 2022

(54) METHODS FOR PAID PLACEMENT OF PROMOTIONAL E-MAIL MESSAGES

(71) Applicant: Google LLC, Mountain View, CA (US)

(72) Inventors: Aaron Nathaniel Rothman, Sunnyvale, CA (US); Deepak Jindal, Los Altos, CA (US); Thompson Alexander Ivor Gawley, Palo Alto, CA (US); Christian Oestlien, San Francisco, CA (US); Stacey Kapadia, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,978

(22) Filed: Jan. 15, 2021

(65) Prior Publication Data

US 2021/0144116 A1    May 13, 2021

Related U.S. Application Data

(63) Continuation of application No. 16/723,272, filed on Dec. 20, 2019, now Pat. No. 10,897,448, which is a continuation of application No. 16/042,875, filed on Jul. 23, 2018, now Pat. No. 10,560,415, which is a continuation of application No. 13/959,863, filed on Aug. 6, 2013, now Pat. No. 10,110,535.

(51) Int. Cl.
*H04L 51/226*      (2022.01)
*H04L 51/224*      (2022.01)

(52) U.S. Cl.
CPC .............. *H04L 51/26* (2013.01); *H04L 51/24* (2013.01)

(58) Field of Classification Search
CPC ....... H04L 51/26; H04L 51/24; G06F 16/951; G06Q 10/107; G06Q 30/0224; G06Q 30/0255; G06Q 30/0277; G06Q 30/0267; G06Q 30/0276
See application file for complete search history.

(56) References Cited

U.S. PATENT DOCUMENTS 6,654,791 B1    11/2003   Bates et al.
7,133,898 B1    11/2006   Malik
7,454,716 B2    11/2008   Venolia
                          (Continued)

OTHER PUBLICATIONS

Final Office Action for U.S. Appl. No. 13/959,863 dated Jul. 20, 2016 (34 pages).

(Continued)

*Primary Examiner* — Todd L Barker
(74) *Attorney, Agent, or Firm* — Marshall, Gerstein & Borun LLP (57) ABSTRACT

A method includes accessing, by a server computer, a plurality of electronic mail messages. The method also includes identifying, by the server computer, at least one of the electronic mail messages as a promoted electronic mail message. The method further includes outputting, for display at a client computing device, an electronic mail interface wherein the promoted electronic mail message is represented in a first position of a display order and a remainder of the electronic mail messages are represented subsequent to the promoted electronic mail message in the display order.

20 Claims, 7 Drawing Sheets

(56) References Cited

U.S. PATENT DOCUMENTS

| | | | |
|---|---|---|---|
| 7,765,212 | B2 | 7/2010 | Surendran et al. |
| 7,885,948 | B2 | 2/2011 | Johnson et al. |
| 8,265,665 | B2 | 9/2012 | Lazaridis |
| 8,639,629 | B1 | 1/2014 | Hoffman |
| 8,782,127 | B2 * | 7/2014 | Addala ............... H04L 12/4625 709/203 |
| 8,949,283 | B1 | 2/2015 | Cornwell et al. |
| 8,970,500 | B2 | 3/2015 | Martin-Cocher et al. |
| 9,009,065 | B2 | 4/2015 | Reis et al. |
| 9,069,934 | B1 * | 6/2015 | Meeboer ............... H04L 63/083 |
| 9,384,502 | B2 * | 7/2016 | Guo ................... G06Q 30/0224 |
| 2002/0163538 | A1 | 11/2002 | Shteyn |
| 2006/0101352 | A1 | 5/2006 | Kohar et al. |
| 2009/0013052 | A1 | 1/2009 | Robarts et al. |
| 2009/0112719 | A1 | 4/2009 | Bhave et al. |
| 2009/0119678 | A1 * | 5/2009 | Shih ........................ H04L 51/00 719/313 |
| 2009/0138826 | A1 | 5/2009 | Barros |
| 2009/0271267 | A1 | 10/2009 | Moukas et al. |
| 2011/0161436 | A1 | 6/2011 | Moore |
| 2011/0246287 | A1 | 10/2011 | Wright et al. |
| 2012/0158494 | A1 | 6/2012 | Reis et al. |
| 2013/0086146 | A1 * | 4/2013 | Addala ............... H04L 12/4625 709/203 |
| 2013/0219297 | A1 * | 8/2013 | Soundararajan .......... G06F 8/38 715/752 |
| 2013/0297604 | A1 | 11/2013 | Sutedja et al. |
| 2014/0058833 | A1 | 2/2014 | Ouimet et al. |
| 2015/0039704 | A1 | 2/2015 | Kursun |
| 2015/0100437 | A1 * | 4/2015 | Guo ................... G06Q 30/0255 705/14.73 |
| 2015/0201062 | A1 * | 7/2015 | Shih .................. G06F 16/24552 455/564 |

OTHER PUBLICATIONS

Final Office Action for U.S. Appl. No. 13/959,863 dated Jun. 15, 2017 (35 pages).
Final Office Action for U.S. Appl. No. 13/959,863 dated Mar. 22, 2018 (7 pages).
Non-Final Office Action for U.S. Appl. No. 13/959,863 dated Dec. 16, 2016 (25 pages).
Non-Final Office Action for U.S. Appl. No. 13/959,863 dated Feb. 2, 2016 (27 pages).
Non-Final Office Action for U.S. Appl. No. 13/959,863 dated Sep. 21, 2017 (17 pages).
Non-Final Office Action for U.S. Appl. No. 16/042,875 dated Apr. 18, 2019 (14 pages).
Non-Final Office Action on U.S. Appl. No. 16/723,272 dated Sep. 4, 2020 (5 pages).
Notice of Allowance for U.S. Appl. No. 13/959,863 dated Sep. 10, 2018 (8 pages).
Notice of Allowance for U.S. Appl. No. 16/042,875 dated Sep. 25, 2019 (11 pages).
Notice of Allowance for U.S. Appl. No. 16/723,272 dated Sep. 16, 2020 (8 pages).

* cited by examiner

METHODS FOR PAID PLACEMENT OF PROMOTIONAL E-MAIL MESSAGES

CROSS-REFERENCE TO RELATED APPLICATIONS

This application is a continuation of, and claims priority to, pending U.S. patent application Ser. No. 16/723,272 filed on Dec. 20, 2019, which is a continuation of U.S. patent application Ser. No. 16/042,875 filed on Jul. 23, 2018, which is a continuation of U.S. patent application Ser. No. 13/959,863 filed Aug. 6, 2013, and entitled "Methods for Paid Placement of Promotional E-Mail Messages." The disclosures of the foregoing applications are incorporated herein by reference in their entirety.

BACKGROUND

The disclosure herein relates generally to electronic mail (e-mail) services that cause an interface representing a list of e-mail messages to be output for display at a client computing device.

Some software applications are provided to users free-of-charge, and generate revenue by displaying advertisements to users of the software application. A common example is a web-based e-mail application that provides e-mail services to users by way of an interface that is displayed in a web-browser or in a dedicated application, such as an "app" that is executed on a mobile computing device, such as a tablet computing device or a smart-phone (a computationally-enabled mobile telephone). These advertisements allow advertisers to reach the users that are selected based on demographic information or contextual information, and often utilized to reach users with respect to whom the advertiser has had no prior contact. These advertisements are typically placed in the software application on the basis of a payment, either directly or indirectly, from the advertiser to the operator of the web-based e-mail application.

Promotional e-mail messages are another common form of internet advertising. Typically, an advertiser that wishes to conduct an e-mail marketing campaign generates a list of e-mail addresses for existing or prospective customers, and generates and sends a promotional e-mail message to each of those existing or prospective customers. Thus, promotional e-mail messages allow advertisers to reach persons with respect to whom the advertiser has had prior contact. As opposed to advertisements that are displayed with software applications, promotional e-mail messages are delivered to users to whom the e-mail message is addressed, without payment to an operator of a web-based e-mail application.

Promotional e-mail messages typically have a low rate of effectiveness. Because most persons receive a very large number of promotional e-mail messages, many are deleted without being read, or are simply ignored. E-mail marketing remains popular, however, because the costs associated with an e-mail marketing campaign are low relative to the benefit to be gained at even low rates of effectiveness.

SUMMARY

The disclosure relates to paid placement of promotional e-mail messages.

One aspect of the disclosed embodiments is a method that includes accessing, by a server computer, a plurality of electronic mail messages; identifying, by the server computer, at least one of the electronic mail messages as a promoted electronic mail message; and outputting, for display at a client computing device, an electronic mail interface wherein the promoted electronic mail message is represented in a first position of a display order and a remainder of the electronic mail messages are represented subsequent to the promoted electronic mail message in the display order.

Another aspect of the disclosed embodiments is a method that includes accessing, by a server computer, a plurality of electronic mail messages; identifying, by the server computer, at least one of the electronic mail messages as a promoted electronic mail message; and outputting, for display at a client computing device, an electronic mail interface that includes an advertisement area and a message index area, wherein the promoted electronic mail message is represented in the advertisement area and a remainder of the electronic mail messages are represented in the message index area.

Another aspect of the disclosed embodiments is a method that includes accessing, by a server computer, a plurality of electronic mail messages; identifying, by the server computer, at least one of the electronic mail messages as a promoted electronic mail message; and outputting, for display at a client computing device, an electronic mail interface that includes an advertisement corresponding to the promoted electronic mail message and a grouping of interface elements each corresponding to a respective electronic mail message from the plurality of electronic mail messages.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for paid placement of promotional e-mail messages are disclosed herein. Because recipients of promotional e-mail messages often receive a large number of e-mail messages, many promotional e-mail messages are not opened or read by the recipient. The systems and methods disclosed herein allow the provider of an e-mail application, such as a web-based e-mail application, to provide paid placement opportunities to senders of promotional e-mails. Thus, although a promotional e-mail is sent to its recipient in a standard manner, such as by sending a message to an e-mail address via the SMTP protocol, the provider of the e-mail application can identify the promotional e-mail message as being associated with a paid advertising campaign, and output an e-mail interface in which the promotional e-mail message is displayed differently than other, non-promoted e-mail messages, such as by applying a preferential sort order to promoted e-mail message, applying a distinct visual style to the promoted e-mail message, or by displaying information corresponding to the promoted e-mail message in a dedicated advertising area.

Figure 1:
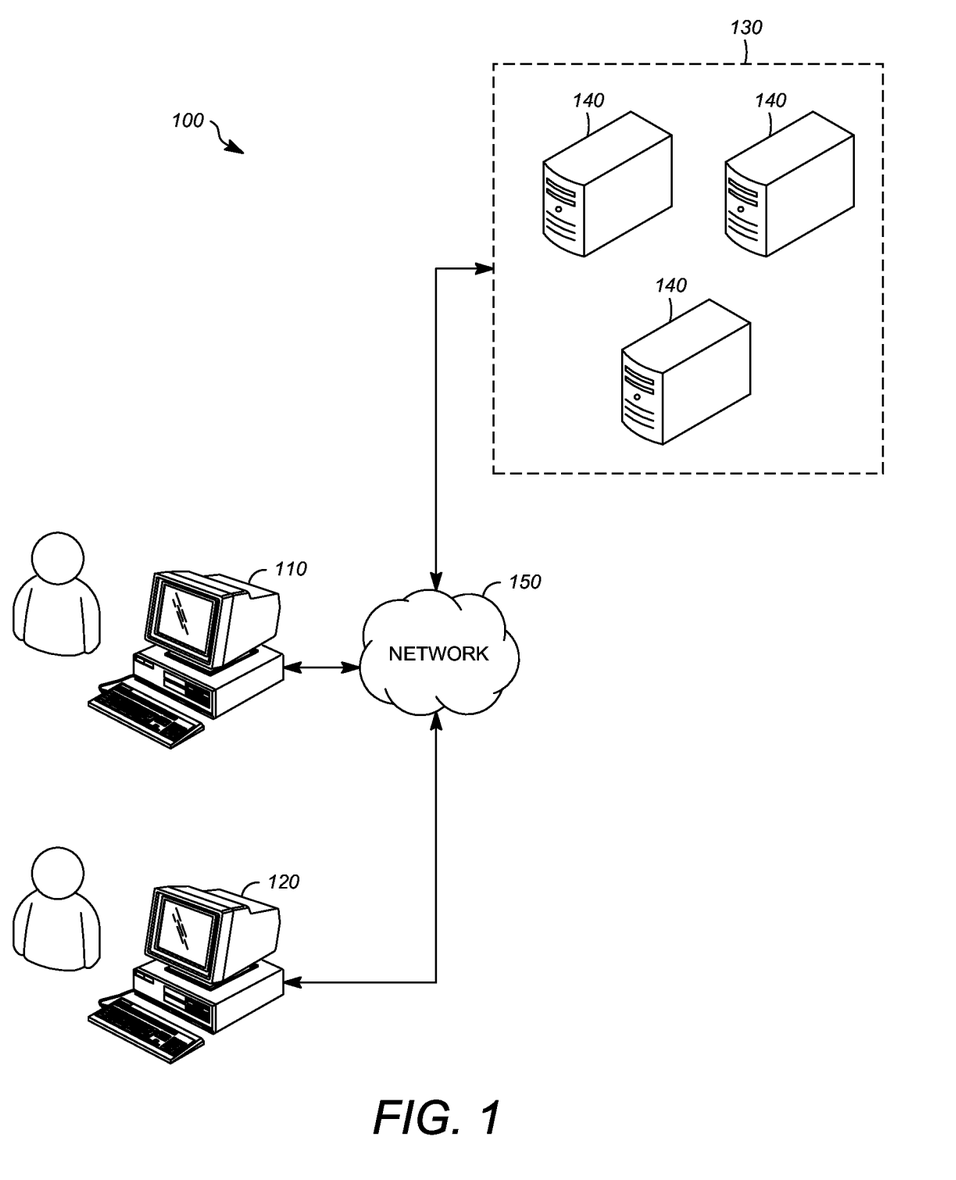
FIG. 1 is a block diagram showing an example of a system for paid placement of promotional e-mail messages.

FIG. 1 shows an example of an environment 100 in which a system for paid placement of e-mail messages can be implemented. The environment 100 can include a user system 110, an advertiser system 120, and an e-mail service 130. The user system 110 and the advertiser system 120 are each representative of a large number (e.g. millions) of user systems and advertiser systems that can be included in the environment 100. The user system 110 and the advertiser systems 120 can each be any manner of computer or computing device, such as a desktop computer, a laptop computer, a tablet computer, or a smart-phone (a computationally-enabled mobile telephone). The e-mail service 130 can be implemented using one or more server computers 140. The user system 110, the advertiser systems 120, and the e-mail service 130 can each be implemented as a single system, multiple systems, distributed systems, or in any other form.

The systems, services, servers, and other computing devices described herein are in communication via a network 150. The network 150 can be one or more communications networks of any suitable type in any combination, including wireless networks, wired networks, local area networks, wide area networks, cellular data networks, and the internet.

The e-mail service 130 provides an e-mail service to the user system 110. The description herein will be made with respect to a web-based e-mail service in that provides a web-browser-based interface for viewing mailboxes and e-mail messages. It should be understood, however, that the e-mail service can be provided in many other forms, such as in the form of an "app" that is executed by a tablet computer or a smart-phone, or in the form of desktop software that is executed by a personal computer.

Figure 2:
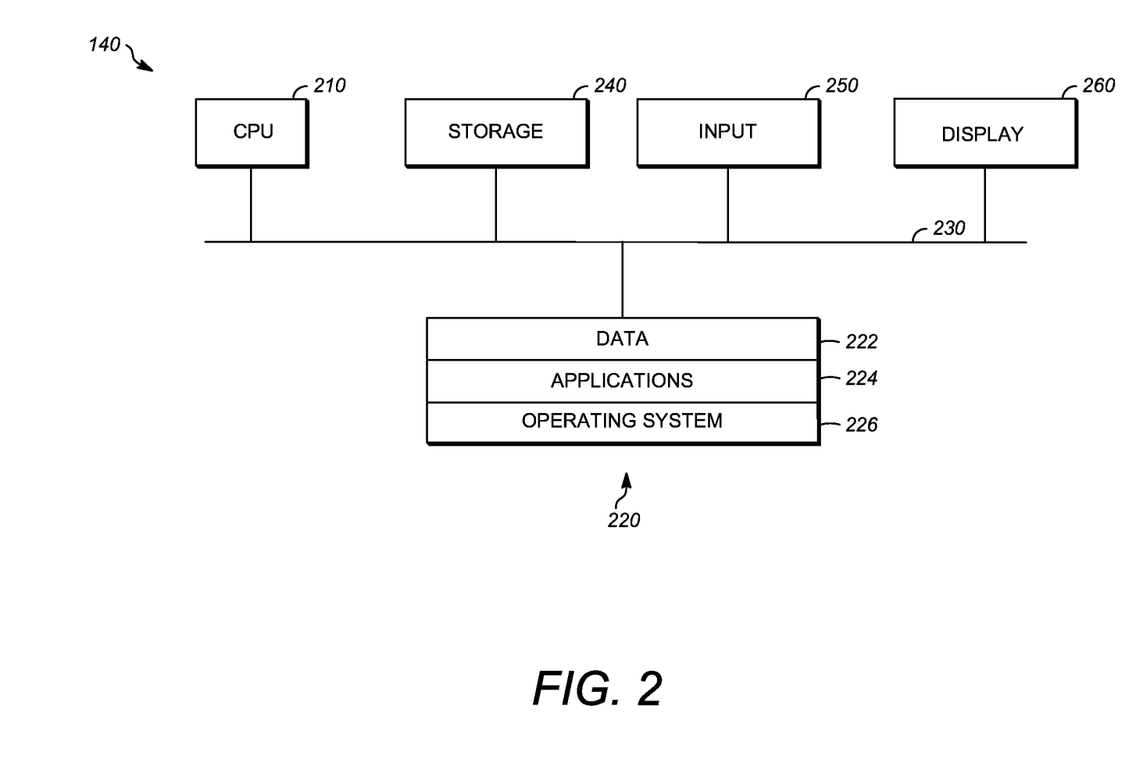
FIG. 2 is a block diagram showing an example of a host computer.

FIG. 2 is a block diagram of an example of a hardware configuration for the one or more server computers 140. The same hardware configuration or a similar hardware configuration can be used to implement the user system 110 and the advertiser systems 120. Each server computer 140 can include a CPU 210. The CPU 210 can be conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 140 can be composed of multiple buses. Further, the storage device 240 can be directly coupled to the other components of the respective one of the server computers 140 or can be accessed via a network and can comprise a single integrated unit such as a memory card or multiple units such as multiple memory cards. The one or more server computers can thus be implemented in a wide variety of configurations.

Figure 3:
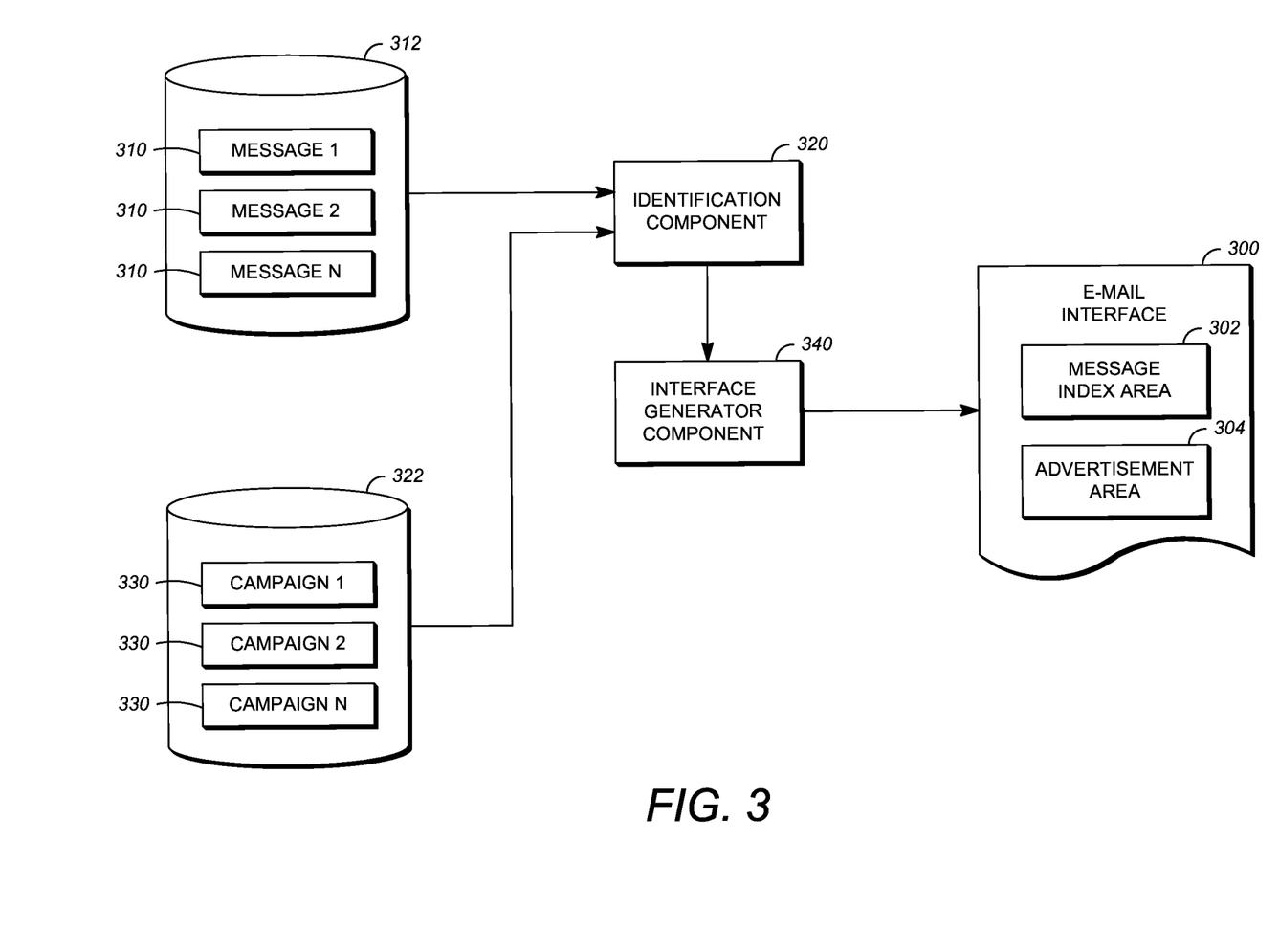
FIG. 3 is an illustration showing an example of generation of an e-mail interface.

FIG. 3 is an illustration showing an example of generation of an e-mail interface 300 by the one or more server computers 140 of the e-mail service 130. The e-mail interface 300 can be generated in response to a request that is received at the e-mail service 130. For example, the e-mail interface 300 can be generated in response to a request that is received from the user system 110. The e-mail interface 300 can include a message index area 302 and an advertisement area 304, as will be explained herein. The e-mail interface 300 can be generated by the e-mail service 130 in the form of information that, when interpreted by the user system 110, causes the e-mail interface 300 to be output for display at the user system 110, such as in the context of a web browser or an application.

The request for the e-mail interface 300 that is received from the user system 110 can relate to a specific user account and/or SMTP e-mail address. In response to the request, the e-mail service 130 accesses e-mail messages 310 that are associated with the user account and/or SMTP e-mail address, and which were each sent to a recipient designated by an e-mail address, such as an SMTP e-mail address, and were received at the e-mail service 130 as a result of being sent to the e-mail address. The e-mail messages 310 can be accessed from, for example, a message database 312 that is implemented by the one or more server computers 140 of the e-mail service 130.

The e-mail messages 310 are analyzed by an identification component 320. The identification component 320 can be implemented in the form of software that is executed by the one or more server computers 140 of the e-mail service 130. The identification component 320 analyzes each of the e-mail messages 310 to determine whether any of the e-mail messages 310 include identifying information that designates the respective e-mail message 310 as a promoted e-mail message. As used herein, "promoted e-mail message" refers to an e-mail message that is associated with a promotional campaign that is implemented by the e-mail service 130, such as a paid advertising campaign in which a fee is charged to the operator of the advertising system 120 responsible for sending the promoted electronic mail message by the operator of the e-mail service 130. The identifying information can be any type of data that is associated with the respective e-mail message 310, such as an alphanumeric identifier included in the body, subject, header, and/or other portion of the e-mail message 310. As one example, where the e-mail message 310 is encoded in the markup language such as HTML, the identifying information can be present in a non-rendered portion of the message, such as a comment, a metatag, or a script. The foregoing types of identifying information are given as examples, and other types of identifying information can be utilized.

Based on the identifying information that is extracted from the e-mail messages 310 by the identification component 320, a promoted e-mail message can be matched to a pre-existing paid advertising campaign using campaign information 330 associated with each of a plurality of respective advertising campaigns. The campaign information 330 can be stored in and accessed from a campaign database 332 that is implemented by the one or more server computers 140 of the e-mail service 130. The campaign information 330 can be utilized in generation of the e-mail interface 300 in conjunction with the promoted e-mail message itself. In addition, the campaign information 330 can specify the identity of the operator of the advertising system 120 that sent the promoted e-mail message or caused the promoted e-mail message to be sent.

In some implementations, the campaign information 330 for each paid advertising campaign can include a list of email addresses that is provided to the e-mail service 130 by the sponsor of the paid advertising campaign. The list of email addresses can correspond to users of the e-mail service 130, and be used as a basis for determining whether or not to cause a specific e-mail message 310 to be displayed as a promoted e-mail message. In one example, the list of e-mail addresses can be used as a basis for triggering promotion of an e-mail message, where the e-mail message is promoted if the message recipient's email address is included in the list of e-mail addresses. In another example, the list of e-mail addresses can be used as a basis for varying the terms by which the e-mail message can be promoted, for example, by increasing a bid amount that the sponsor of the message is willing to pay for promotion of the e-mail message in an auction-based promotion system if the message recipient's email address is included in the list of e-mail addresses. In another example, the list of e-mail addresses can be used as a basis for preventing promotion of an e-mail message, where the e-mail message is will not be promoted if the message recipient's email address is included in the list of e-mail addresses.

In some implementations, a paid advertising campaign can be created by the party associated with the advertising system 120 after the e-mail messages 310 are sent to the users of the e-mail service 130. In this implementation, the sender provides information that allows identification the e-mail messages 310 to be promoted, and for auction-based systems, specifies payment terms such as a budget and, optionally, a bid amount for each view or open of the e-mail messages 310 that correspond to the paid advertising campaign.

An interface generator component 340 is operable to generate the e-mail interface 300. The interface generator component 340 can receive the e-mail messages 310 from the message database 312, the campaign information 330 from the campaign database 332, and information identifying one or more of the e-mail messages 310 as promoted e-mail messages from the identification component 320.

In some situations, the identification component 320 may determine that multiple ones of the e-mail messages 310 are promoted e-mail messages, and the interface generator component 340 will select a subset of one or more of the promoted e-mail messages that were identified by the identification component 320 for use as the promoted e-mail messages in the e-mail interface 300. The identified e-mail messages 310 that are not selected by the interface generator component 340 will be treated as standard e-mail messages 310, wherein standard e-mail messages are those e-mail messages that are given the same visual style within the e-mail interface 300 with respect to one another and are not given a preferential placement or graphical style within the e-mail interface 300.

In one implementation, the interface generator component selects a subset of one or more of the promoted e-mail messages that were identified by the identification component 320 for use as the promoted e-mail messages in the e-mail interface 300 using an auction-type system. In a simple example, the senders associated with the promoted e-mail messages can each designate a budget for the paid advertising campaign, and the advertising system 130 will set the conditions under which the e-mail messages 310 will be promoted in a manner that maximizes the return on investment for each sender. In another example, the senders associated with the promoted e-mail messages can each designate a price that they are willing to pay for promotion of their message, one or more of the highest bids will be accepted, and those e-mail messages will be promoted. In another example, the senders associated with the promoted e-mail messages are only charged for promotion of their e-mail messages if the message is opened, and an auction based system is applied that ranks the e-mail messages based on the price that the sender is willing to pay, as well as a probability that the e-mail message will be opened to determine which e-mail messages will be displayed as promoted e-mail messages in the e-mail interface 300. When two or more e-mail messages are selected as the promoted e-mail messages, they can be ranked, such as by the auction systems described above, and ordered according to their rankings. The e-mail messages that are not selected as promoted e-mail messages are displayed among the standard e-mail messages.

The interface generator component 340 can generate the e-mail interface 300 such that the standard e-mail messages from the plurality of e-mail messages 310 are represented within a message index area 302. The message index area can be a view with interface elements corresponding to each of the e-mail messages 310 represented therein, wherein a user interface action such as clicking, tapping, or otherwise selecting, can be applied to the interface elements representing the e-mail messages 310 to display each of the e-mail messages 310. In one example, the message index area is a list view, where each of the standard e-mail messages from the plurality of e-mail messages 310 is represented by a standard list view item, which is an interface element that represents one of the e-mail messages and can be actuated (clicked, etc.) to cause display of additional information, such as the contents of the e-mail message 310.

In some implementations, the promoted e-mail messages from the plurality of e-mail messages are represented by user interface items within the message index area and are differentiated from the user interface elements that designate the standard e-mail messages from the plurality of e-mail messages 310. For example, the user interface elements representing the standard e-mail messages can be subject to a display order rule, such as a rule that sorts the e-mail messages 310 based on criteria associated with the e-mail messages 310. One example is a chronological rule, whereby the e-mail messages 310 are sorted by date of transmission for receipt. In this example, the promoted e-mail messages can be differentiated from the standard e-mail messages by placing the promoted e-mail messages at the front of a display order without subjecting the promoted e-mail messages to the display order rule. Thus, for example, a promoted e-mail message could occupy a first position in the display order, while standard e-mail messages appear after the promoted e-mail message in the display order, under circumstances where the promoted e-mail message would not appear first in the display order if it were subject to the display order rule.

As another example, the promoted e-mail messages can be represented by user interface elements that appear within the message index area 302 but can be differentiated by a distinct graphical style. Thus, a first graphical style would be applied to the promoted e-mail messages while a second graphical style would be promoted to the standard e-mail messages, where the first graphical style differs from the second graphical style by virtue of one or more of color, size, outline, type face, or another graphical characteristic. In another example, the promoted e-mail messages are not represented within the message index area 302 but are instead represented in a dedicated advertisement area 304. In this example, the promoted e-mail messages are given a different graphical style as compared to the standard e-mail messages.

Figure 4:
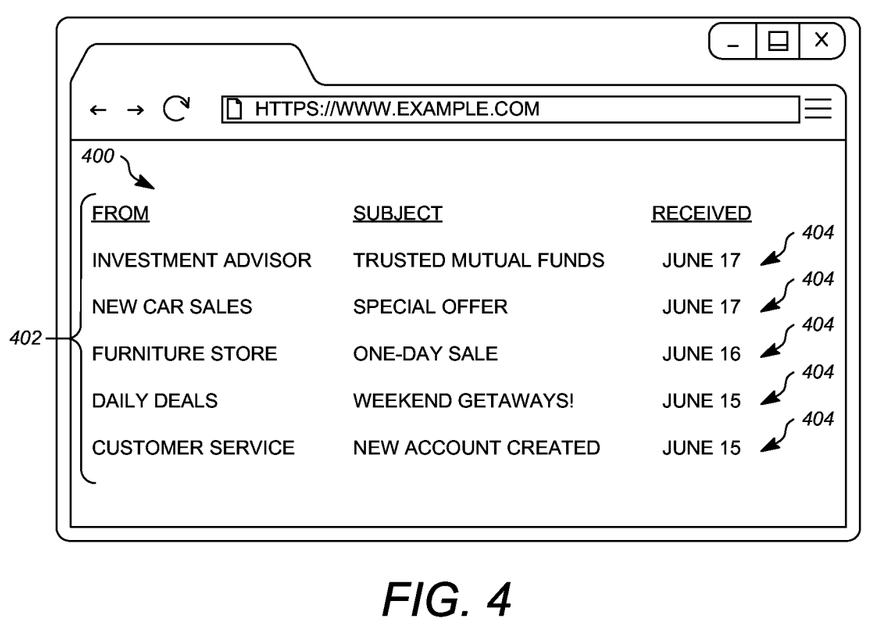
FIG. 4 is an example of an electronic mail interface screen.

FIG. 4 shows an example of an e-mail interface screen 400. The e-mail interface screen 400 is displayed in the context of a web browser and can be, for example, a webpage encoded in a markup language such as HTML that is transmitted from the e-mail service 130 to the user system 110 and output for display at the user system 110.

The e-mail interface screen 400 includes a message index area 402 in the form of a list view that includes a plurality of standard list items 404. The standard list items 404 each correspond to an e-mail message and include information regarding the e-mail message, such as an identity of a sender of the e-mail message, a subject of the e-mail message, and a date or time of receipt of the e-mail message. Each of the standard list items can be interactive, such that clicking or otherwise activating each of the standard list items 404 causes display of the e-mail message that is associated with the respective standard list items 404. In the e-mail interface screen 400, none of the e-mail messages represented within the message index area 402 are given preferential treatment, such as a preferred position in the display order or a distinct graphical style. Instead, each of the standard list items 404 is sorted according to a chronological display order rule and is portrayed in a consistent graphical style.

Figure 5:
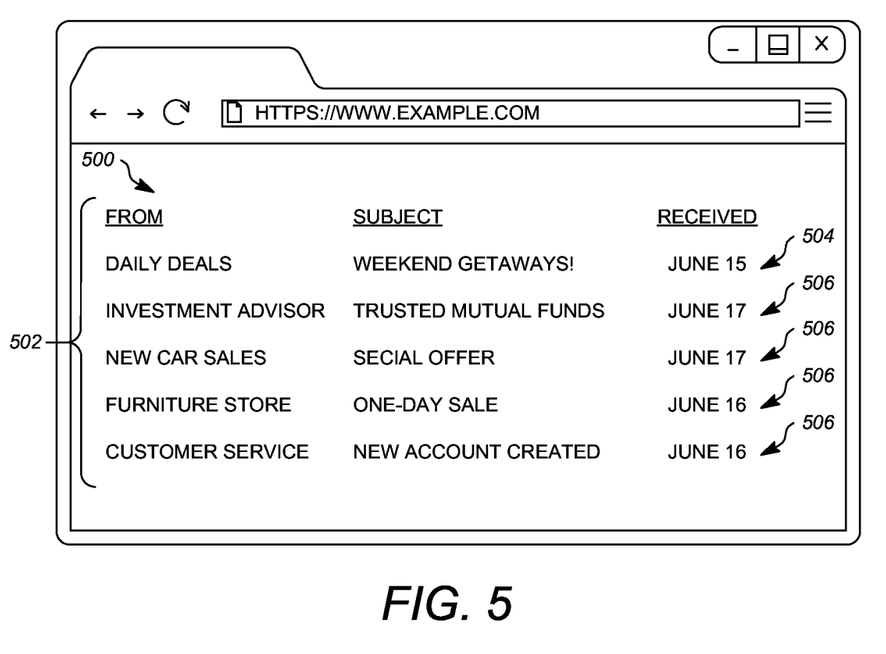
FIG. 5 is an example of an electronic mail interface screen with paid placement of promotional e-mail messages according to a first example.

FIG. 5 is an example of an electronic mail interface screen 500 that incorporates paid placement of promotional e-mail messages according to a first example. The e-mail interface screen 500 includes a message index area 502 in the form of a list view. A promoted list item 504, which corresponds to a promoted e-mail message, occupies a first position in a display order within the list view of the message index area 502. The promoted list item 504 appears above a plurality of standard list items 506, such that the promoted list item 504 appears before the standard list items 506 in a display order. The standard list items 506 each correspond to an electronic mail message that is not a promoted electronic mail message. The standard list items 506 are displayed in an order determined by a display order rule, which, in this case, is a chronological display order. The promoted list item 504 appears vertically above and before the standard list items 506 in the display order because it is not subject to the display order rule, as are the standard list items 506. In this example, the promoted list item 504 and the standard list items 506 all have a common graphical style.

Figure 6:
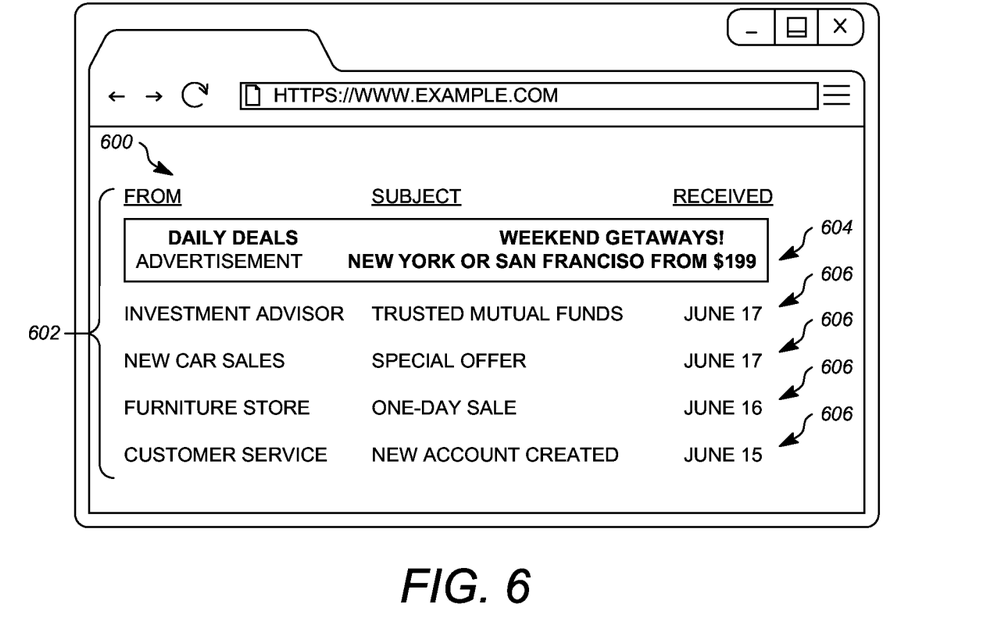
FIG. 6 is an example of an electronic mail interface screen with paid placement of promotional e-mail messages according to a second example.

FIG. 6 shows an example of an electronic mail interface screen 600 with paid placement of promotional e-mail messages according to a second example. The e-mail interface screen 600 includes a message index area 602 in the form of a list view that includes a promoted list item 604 and a plurality of standard list items 606. The promoted electronic mail message is represented by the promoted list item 604. In this example, the promoted list item 604 is not subject to a display order rule that is applied to the standard list items 606, which in this example is a chronological display order rule. Instead, the promoted list item 604 is display above the standard list items 606. In addition, the promoted list item 604 has a different graphical style as compared to the standard list items 606, by virtue of, for example, size, inclusion of a border, different font sizes, styles, text color, background color, supplemental text messages, and/or layout. Other differences in graphical style can be utilized to differentiate the promoted list item 604 from the standard list items 606.

Figure 7:
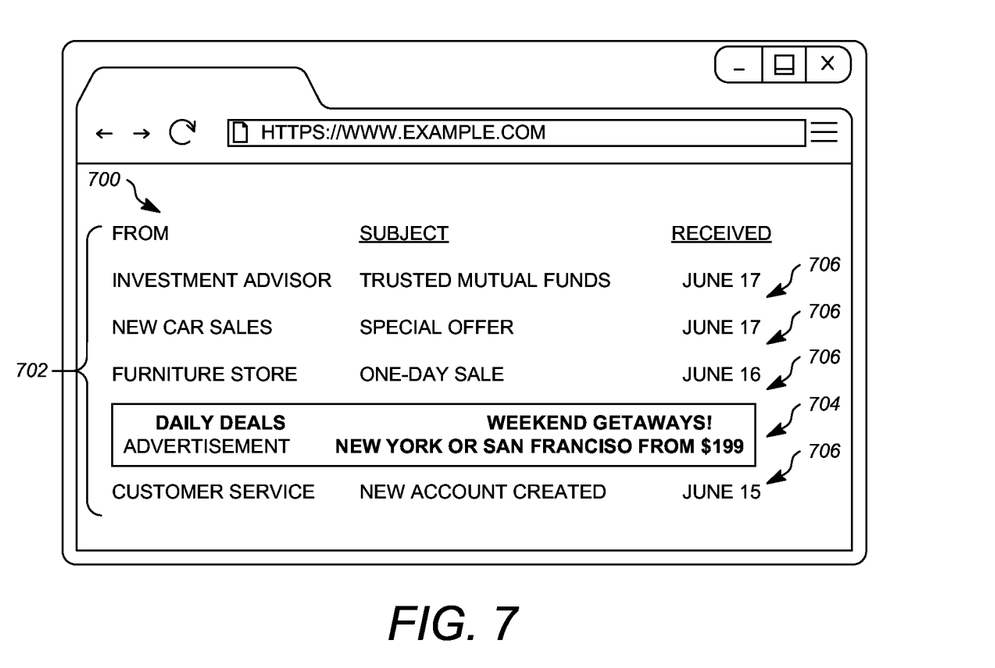
FIG. 7 is an example of an electronic mail interface screen with paid placement of promotional e-mail messages according to a third example.

FIG. 7 shows an example of an electronic mail interface screen 700 with paid placement of promotional e-mail messages according to a third example. The e-mail interface screen 700 includes a message index area 702 in the form of a list view that includes a promoted list item 704 and a plurality of standard list items 706. In this example, the promoted list item is subject to the same display order rule as the standard list items 706, which in this example is a chronological display order rule. To differentiate the promoted list item 704 from the standard list items 706, the promoted list item 704 has a different graphical style as compared to the standard list items 706, by virtue of, for example, size, inclusion of a border, different font sizes, styles, text color, background color, supplemental text messages, and/or layout.

Figure 8:
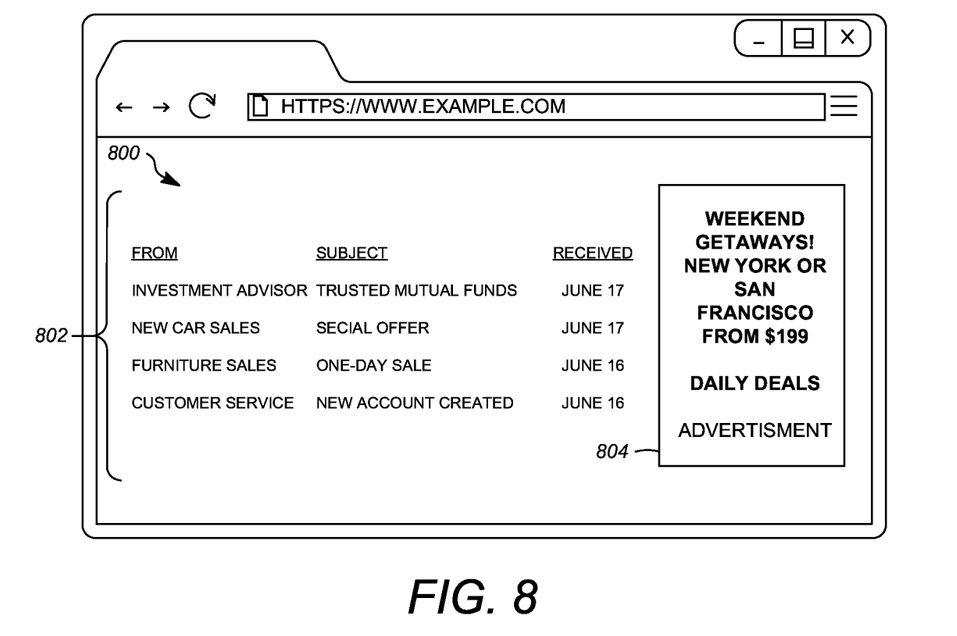
FIG. 8 is an example of an electronic mail interface screen with paid placement of promotional e-mail messages according to a fourth example.

FIG. 8 shows an example of an electronic mail interface screen 800 with paid placement of promotional e-mail messages according to a fourth example. The e-mail interface screen 800 includes a message index area 802 in the form of a list view that includes a plurality of standard list items. The e-mail interface screen 800 also includes an advertisement area 804 that is separate from the message index area 802. The advertisement area 804 can be positioned, above, below, or to a lateral side of the message index area 802. In the illustrated example, the advertisement area is positioned at the right-hand side of the message index area 802. To further differentiate the advertisement area 804 from the message index area 802, the advertisement area 804 has a different graphical style as compared to the message index area, by virtue of, for example, size, inclusion of a border, different font sizes, styles, text color, background color, supplemental text messages, and/or layout.

In each of the examples shown in FIGS. 5-8, a single promoted electronic mail message is represented. It should be understood, however, that multiple promoted electronic mail messages could be represented by promoted list view items or advertisement areas.

Figure 9:
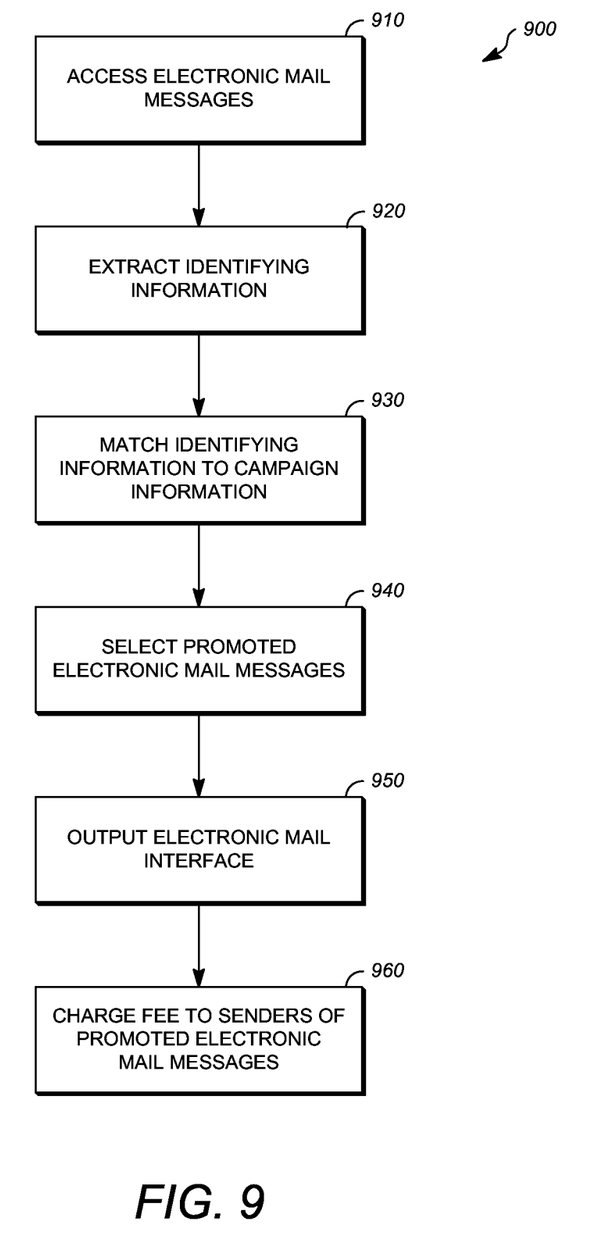
FIG. 9 is a flow chart showing an example of a process for paid placement of promotional e-mail messages.

FIG. 9 is a flow chart showing a process 900 for paid placement of e-mail messages.

The operations described in connection with the process 900 can be performed at one or more computers, such as at the one or more server computers 140 of the e-mail service 130. When an operation is performed by one or more computers, it is completed when it is performed by one computer. The operations described in connection with the process 900 can be embodied as a non-transitory computer readable storage medium including program instructions executable by one or more processors that, when executed, cause the one or more processors to perform the operations. For example, the operations described in connection with the process 900 could be stored at the memory 220 of a respective one of the server computers 140 and be executable by the CPU 210 thereof.

At operation 910, a plurality of electronic mail messages are accessed. Operation 910 can be performed at a server computer, such as at the one or more server computers 140 of the e-mail service 130. For example, the electronic mail messages 310 can be accessed by the one or more server computers 140 of the e-mail service 130 from the message database 312.

At operation 920, identifying information is extracted from one or more of the electronic mail messages that were accessed at operation 910. In particular, each electronic mail messages that is accessed at operation 910 can be analyzed to determine whether it contains identifying information, and if so, the identifying information is extracted. This can be performed, for example, in the manner described in connection with the identification component 320.

At operation 930, the identifying information that was extracted at operation 920 is matched to campaign information, such as information that relates to a paid advertising campaign. For example, the identifying information from the e-mail messages 310 can be matched against campaign information 330 from the campaign database 332 as described in connection with the identification component 320.

At operation 940, promoted electronic mail messages are selected. In particular, some or all of the electronic mail messages accessed at operation 910 that include identifying information that was extracted at operation 920 and matched to campaign information at operation 930 can be selected as promoted electronic mail messages. In some implementations, a maximum number of these messages are selected as promoted electronic mail messages using any suitable criteria, for example, in the manner described in connection with the interface generator component 940.

At operation 950, an electronic mail interface is generated and output for display, for example, as described in connection with the electronic mail interface 300 generated by the interface generator component 340. The electronic mail interface differentiates the promoted electronic mail messages from standard (non-promoted) electronic mail messages by features such as position and graphical style. As examples, the promoted electronic mail messages can be differentiated from standard electronic mail messages as described in connection with the electronic mail interface 300 or the examples described with reference to FIGS. 5-8. The electronic mail interface can be output for display, for example, at the user system 110, by transmission of information from the electronic mail service 130 to the user system 120 that, when interpreted at the user system 110, causes display of the electronic mail interface.

At operation 960, the provider of the electronic mail interface charges a fee to the third parties that sent the promoted electronic mail messages, such as the parties associated with the advertiser systems 120. In some implementations, the fee is charged based on display of the promoted e-mail message. In other implementations, the fee is charged if the promoted e-mail message is opened.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method of providing dynamic interfaces to display prioritized electronic communications differently from other electronic communications, the method comprising:

transmitting, by a client device, via a communications network, a request to access an account of electronic messages associated with the client device to a computer system communicatively coupled to the client device via the communications network, the account of electronic messages associated with a plurality of electronic messages including a first electronic message that belongs to a predefined category of electronic messages eligible for prioritization, each electronic message of the predefined category of electronic messages eligible for prioritization generated for distribution to a plurality of accounts of electronic messages selected in accordance with a predefined selection policy;

receiving, by the client device and responsive to the request, a user interface including the plurality of electronic messages and a first set of display parameters defined by the computing system for displaying the first electronic message, the first set of display parameters including i) displaying a visual indicator indicating that the first electronic message belongs to the predefined category of electronic messages eligible for prioritization, ii) representing the first electronic message in a first position of a display order and representing other electronic messages of the plurality of electronic messages subsequent to the first electronic message in the display order, iii) representing the first electronic message in a visual format different from the other electronic messages of the plurality of electronic messages, or iv) representing the first electronic message in a dedicated area of the user interface different than a message index area within which the other electronic messages of the plurality of electronic messages are displayed; and displaying, by the client device, the first electronic message according to the first set of display parameters.

2. The method of claim 1, wherein representing the first electronic message in a first position of a display order and representing other electronic messages of the plurality of electronic messages subsequent to the first electronic message in the display order includes subjecting the other electronic messages of the plurality of electronic messages to a display order rule whereas the first electronic message is not subject to the display order rule.

3. The method of claim 2, wherein the display order rule is a chronological rule.

4. The method of claim 1, wherein the user interface includes a list view with the first electronic message represented by a prioritized list item and the other electronic messages of the plurality of electronic messages represented by standard list items.

5. The method of claim 4, wherein the prioritized list item appears vertically above the standard list items.

6. The method of claim 4, wherein the user interface utilizes a first graphical style for the prioritized list item and a second graphical style for the standard list items.

7. The method of claim 1, wherein the account of electronic messages is an electronic mail or message account and the plurality of electronic messages include electronic mail messages or electronic messages.

8. The method of claim 1, wherein the first electronic message is identified to belong to the predefined category of electronic messages eligible for prioritization based on information identifying a content provider of the first electronic message.

9. The method of claim 1, wherein the first electronic message is identified to belong to the predefined category of electronic messages eligible for prioritization based on information in the first electronic message indicative of the predefined category of electronic messages eligible for prioritization.

10. A computing device, comprising:
   at least one processor; and
   at least one memory including computer code instructions stored thereon, the computer code instructions, when executed, cause the at least one processor to:
   transmit, via a communications network, a request to access an account of electronic messages associated with the computing device to a computer system communicatively coupled to the computing device via the communications network, the account of electronic messages associated with a plurality of electronic messages including a first electronic message that belongs to a predefined category of electronic messages eligible for prioritization, each electronic message of the predefined category of electronic messages eligible for prioritization generated for distribution to a plurality of accounts of electronic messages selected in accordance with a predefined selection policy;
   receive, responsive to the request, a user interface including the plurality of electronic messages and a first set of display parameters defined by the computing system for displaying the first electronic message, the first set of display parameters including i) displaying a visual indicator indicating that the first electronic message belongs to the predefined category of electronic messages eligible for prioritization, ii) representing the first electronic message in a first position of a display order and representing other electronic messages of the plurality of electronic messages subsequent to the first electronic message in the display order, iii) representing the first electronic message in a visual format different from the other electronic messages of the plurality of electronic messages, or iv) representing the first electronic message in a dedicated area of the user interface different than a message index area within which the other electronic messages of the plurality of electronic messages are displayed; and
   display the first electronic message according to the first set of display parameters.

11. The electronic system of claim 10, wherein representing the first electronic message in a first position of a display order and representing other electronic messages of the plurality of electronic messages subsequent to the first electronic message in the display order includes subjecting the other electronic messages of the plurality of electronic messages to a display order rule whereas the first electronic message is not subject to the display order rule.

12. The electronic system of claim 11, wherein the display order rule is a chronological rule.

13. The electronic system of claim 10, wherein the user interface includes a list view with the first electronic message represented by a prioritized list item and the other electronic messages of the plurality of electronic messages represented by standard list items.

14. The electronic system of claim 13, wherein the prioritized list item appears vertically above the standard list items.

15. The electronic system of claim 13, wherein the user interface utilizes a first graphical style for the prioritized list item and a second graphical style for the standard list items.

16. The electronic system of claim 10, wherein the account of electronic messages is an electronic mail or message account and the plurality of electronic messages include electronic mail messages or electronic messages.

17. The electronic system of claim 10, wherein the first electronic message is identified to belong to the predefined category of electronic messages eligible for prioritization based on information identifying a content provider of the first electronic message.

18. The electronic system of claim 10, wherein the first electronic message is identified to belong to the predefined category of electronic messages eligible for prioritization based on information in the first electronic message indicative of the predefined category of electronic messages eligible for prioritization.

19. A non-transitory computer-readable medium with computer code instructions stored thereon for providing dynamic electronic mail interfaces to display prioritized communications differently from other communications, the computer code instructions, when executed, cause one or more processors to:
   transmit, via a communications network, a request to access an account of electronic messages associated with the computing device to a computer system communicatively coupled to the computing device via the communications network, the account of electronic messages associated with a plurality of electronic messages including a first electronic message that belongs to a predefined category of electronic messages eligible for prioritization, each electronic message of the predefined category of electronic messages eligible for prioritization generated for distribution to a plurality of accounts of electronic messages selected in accordance with a predefined selection policy;
   receive, responsive to the request, a user interface including the plurality of electronic messages and a first set of display parameters defined by the computing system for displaying the first electronic message, the first set of display parameters including i) displaying a visual indicator indicating that the first electronic message belongs to the predefined category of electronic messages eligible for prioritization, ii) representing the first electronic message in a first position of a display order and representing other electronic messages of the plurality of electronic messages subsequent to the first electronic message in the display order, iii) representing the first electronic message in a visual format different from the other electronic messages of the plurality of electronic messages, or iv) representing the first electronic message in a dedicated area of the user interface different than a message index area within which the other electronic messages of the plurality of electronic messages are displayed; and
   display the first electronic message according to the first set of display parameters.

20. The non-transitory computer-readable medium of claim 19, wherein the account of electronic messages is an electronic mail or message account and the plurality of electronic messages include electronic mail messages or electronic messages.

* * * * *